(12) United States Patent
Brand et al.

(10) Patent No.: US 7,712,038 B2
(45) Date of Patent: May 4, 2010

(54) DEVICE AND METHOD FOR FINDING AND DISPLAYING INFORMATION

(75) Inventors: Michael Brand, Wiesloch (DE); Frank Steigleder, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1500 days.

(21) Appl. No.: 10/443,925

(22) Filed: May 22, 2003

(65) Prior Publication Data

US 2004/0046805 A1 Mar. 11, 2004

(30) Foreign Application Priority Data

May 31, 2002 (DE) ................. 102 24 304

(51) Int. Cl.
*G06F 3/048* (2006.01)
(52) U.S. Cl. .................... 715/771; 715/851
(58) Field of Classification Search ............ 715/513, 715/733, 716, 760, 771, 851; 707/2, 3, 100
See application file for complete search history.

(56) References Cited

U.S. PATENT DOCUMENTS

| | | | | |
|---|---|---|---|---|
| 5,272,769 | A | 12/1993 | Strnatka et al. | 395/161 |
| 5,479,601 | A * | 12/1995 | Matheny et al. | 715/700 |
| 5,774,361 | A | 6/1998 | Colardelli, III et al. | 364/424.034 |
| 5,978,804 | A * | 11/1999 | Dietzman | 715/500.1 |
| 6,121,966 | A | 9/2000 | Teodosio et al. | 345/346 |
| 6,219,055 | B1 * | 4/2001 | Bhargava et al. | 715/850 |
| 6,408,292 | B1 * | 6/2002 | Bakalash et al. | 707/2 |
| 7,007,228 | B1 * | 2/2006 | Carro | 715/513 |
| 7,079,990 | B2 * | 7/2006 | Haller et al. | 703/2 |
| 2001/0050687 | A1 | 12/2001 | Iida et al. | 345/381 |

(Continued)

FOREIGN PATENT DOCUMENTS

DE 19946485 4/2001

(Continued)

OTHER PUBLICATIONS

Lieberman "A Multi-Scale, Multi-Layer, Translucent Virtual Space" In: Information Visualization, 1997 Proceedings. In: IEEE Conference on, 1997, S. 124-131.

(Continued)

*Primary Examiner*—Weilun Lo
*Assistant Examiner*—Truc T Chuong
(74) *Attorney, Agent, or Firm*—Davidson, Davidson & Kappel, LLC

(57) ABSTRACT

A device and a method for finding information elements (1) in one or more objects (7), the information elements (1) being storable in a storage device and the objects (7) being displayable on a display device via a graphical user interface (18). The present invention has the feature that the information elements (1) are arranged in a coordinate system of a graphically displayed object (7) so that each information element (1) has associated therewith at least one coordinate point in the graphically displayed object (7), that, for finding the desired information element (10) using the graphical user interface (18), at least one selection window (6) is present which is variable in size and shape and which allows selection of an arbitrarily-sized subset of coordinate points and associated information elements (1) of the object (7), and that the selected information elements (9, 10) are displayable on the graphical user interface (18) of the display device.

15 Claims, 16 Drawing Sheets

U.S. PATENT DOCUMENTS

2003/0055812 A1\* 3/2003 Williams et al. ............... 707/1
2003/0103083 A1\* 6/2003 Denny et al. ................ 345/771

FOREIGN PATENT DOCUMENTS

| JP | 04-364583 | 12/1992 |
| JP | 11-097540 | 4/1999 |
| JP | 11-161669 | 6/1999 |

OTHER PUBLICATIONS

Keahey "The Generalized Detail-In-Context Problem" In: Willis G. And Dill J., Editors Proceedings of the IEEE Symposium on Information Oct. 19-20, 1998.

Lucy Terry Nowell et al. Association for Computing Machinery: "Visualizing Search Results: Some Alternatives to Query-Document Similarity", Proceedings of the 19$^{th}$ Annual International ACM SIGIR Conference on Research and Development in Information Retrieval. Zurich, Aug. 18-22, 1996. Bd. Conf. 19, Aug. 18, 1996, pp. 67-75, XP 000788310. ISBN: 0-8971-792-8.

Ricardo Baeza-Yates et al.: "Modern Information Retrieval, Chapter 10: User Interfaces and Visualization". New York: ACM Press, 1999; Harlow, GB: Addison Wesley, 1999, pp. 257-339, XP002210866. ISBN: 0-201-39829-X.

Ricardo Baeza-Yates et al.: "Modern Information Retrieval, Chapter 5: Query Operations". New York: ACM Press, 1999; Harlow, GB: Addison Wesley, 1999, pp. 117-139, XP002311981. ISBN: 0-201-39829-X.

Mary Jo Wagner: "Rendering Records the Digital Way in Orange County". Earth Observation Magazine [Online], vol. 9, No. 12, Dec. 31, 2000, pp. 1-4, XP 002394290. ISSN: 1076-3430 <http://www.eomonline.com/common/archives/dec00/wagner.htm>.

Rejection Notice for Japanese Patent Application No. 2003-157113 (JP application related to this application), dispatched by the Japanese Patent Office on Feb. 4, 2009, and English translation thereof.

\* cited by examiner

| operation | maintenance | part identification | component subassembly | safety | service | set-up | DPI3 | DPI2 | DPI1 |
|---|---|---|---|---|---|---|---|---|---|
|  |  | X |  |  |  | X |  |  | feeder |
| X | X | X |  |  | X | X |  | drive |  |
|  | X | X |  | X | X |  | X | valve | suction-head |
| X |  |  |  |  | X |  |  |  |  |
|  |  | X | X | X |  |  |  |  |  |
| X | X |  |  |  | X | X |  | preset | delivery device |
|  |  | X | X |  |  |  | decurler | air- |  |
| X |  |  |  | X |  |  |  | supply |  |
| X | X | X |  |  |  | X |  |  |  |
|  |  | X |  | X |  |  |  | bearing arrangement | inking system |
| X |  | X |  |  | X |  |  |  |  |
|  |  | X |  |  | X | X | motor | reversing | printing unit |
| X | X |  |  |  | X | X |  | system |  |
|  |  | X |  |  |  |  | drive | pre- |  |
|  | X | X |  |  | X | X |  | gripper |  |
|  |  | X |  | X |  |  |  |  |  |
| X |  |  |  | X |  | X | drive | varnish-metering | varnishing unit |
|  | X |  |  |  | X |  |  | cylinder- |  |
|  |  |  |  | X | X |  |  | register |  |
| X |  | X |  |  |  | X |  |  |  |
|  | X |  |  |  |  | X |  | number of degrees | machine, total |
|  |  |  | X |  |  | X | valves | pneumatic |  |
|  | X |  |  |  |  |  |  |  |  |

Fig. 1a

DEVICE AND METHOD FOR FINDING AND DISPLAYING INFORMATION

Priority to German Patent Application No. 102 24 304.2, filed May 31, 2002 and hereby incorporated by reference herein, is claimed.

BACKGROUND INFORMATION

The present invention relates to a device and a method for finding information elements in one or more objects, the information elements being storable in digital form in a storage device and the objects being displayable on a display device via a graphical user interface.

When working with today's complex mechanical engineering products, the user is often confronted with unsolvable problems concerning the operation and the finding of parts to be service or possibly replaced. Each manufacturer uses different names for certain parts of their machines and different ways of structuring the operating and maintenance instructions pertaining to the machines. Therefore, to be able to find one's way around the operating and maintenance instructions, the user must often be acquainted with the terminology of the terms used for the individual parts of his/her machine. The machines in question include, for example, printing presses, machine tools, but also automobiles, trucks, traveling cranes, etc.

To make it easier for the operator or user to find specific parts to be serviced or replaced or in order to facilitate the operation of his/her machine, so-called online operating and maintenance instructions are increasingly integrated into the respective machine, besides the conventional, mostly very comprehensive and thick manuals for operation and maintenance. The user or operator can view these instructions, for example, on a display screen which is present on or integrated into the machine anyway. In this context, there are solutions in which the conventional paper manual is converted one-to-one to a PDF or HTML document in software. These are classical tree structures with tables of content, analogous to paper publications. However, the advantages of modern software-aided navigation and search methods are not used in this manner.

Moreover, a structure containing so-called "hyperlinks" is known from the field of the Internet, i.e., references are made from marked objects, whether they are words or drawings, to further information sources; the user navigating from hyperlink to hyperlink. However, this is very unstructured and highly time-consuming, because the user finds himself/herself led astray very quickly.

BRIEF SUMMARY OF THE INVENTION

Therefore, it is an object of the present invention to provide a device and a method for simplified operation and simplified finding of parts or components of a machine or of an object having a similarly complex design, the device and method preferably not requiring the user or operator to have much a priori knowledge of the machine or of the associated terminology of the machine manufacturer.

The present invention provides a device for finding information elements (1) in one or more objects (7), the information elements (1) being storable in a storage device, the objects (7) being displayable on a display device via a graphical user interface (18). The information elements (1) are arranged in a coordinate system of a graphically displayed object (7) so that each information element (1) has associated therewith at least one coordinate point in the graphically displayed object (7). For finding the desired information element (10) using the graphical user interface (18), at least one selection window (6) is present which is variable in size or shape and which allows selection of an arbitrarily-sized subset of coordinate points and associated information elements (1) of the object (7). The selected information elements (9, 10) are displayable on the graphical user interface (18) of the display device.

The present invention also provides a method for finding information elements (1) in one or more objects (7), the information elements (1) being stored in a storage device, the objects (7) being displayed on a display device via a graphical user interface (18). The information elements (1) are arranged in a coordinate system of a graphically displayed object (7) so that each information element (1) has associated therewith at least one coordinate point in the graphically displayed object (7). In order to find the desired information element (10) using the graphical user interface (18), at least one selection window (6) is used which is variable in size or shape and which is used to select an arbitrarily-sized subset of coordinate points and associated information elements (1) of the object (7). The selected information elements (9, 10) are displayed on the graphical user interface (18) of the display device.

The great advantage of the present invention is that it enables the user of a machine to learn the operation and maintenance thereof in a purely visual manner. For this purpose, the machine concerned must have a computer, or a suitable computer must be present near the machine. This can be, for example, a commercial PC or laptop, composed of a processor, main memory, and hard disk storage, including suitable interfaces to peripheral devices. The hard disk storage of the computer contains the machine parts required for operation and the machine parts to be serviced in the form of information elements in digitized form. If the computer has an interface to the machine, then data that disables certain functions and operations of the inventive method and device as a function of the configuration and current functional condition of the machine can be exchanged via the interface. Moreover, a monitor is usefully provided as a display device; the individual information elements and the objects to be explained, i.e. the machine(s), being displayable on the monitor via a graphical user interface. In some machines, for example, modern printing presses, a display device, in particular, a TFT flat screen display, is present anyway, and a suitable PC is integrated as well. This results in the great advantage of the present invention that no particularly great effort needs to be made to equip existing modern printing presses with the device according to the present invention.

According to the present invention, the object to be displayed is covered with a coordinate system so that each information element, that is, the parts or subassemblies of the machine, is associated with a specific point in the coordinate system. Of course, such an information element can also have a plurality of coordinate points if it is more extended in space or composed of a plurality of further parts or subassemblies. In order for the user to be able to find the respective information elements on its display device, the graphical user interface features a selection window which is variable in size and shape and which can be dragged across the object displayed in the graphical user interface. In this manner, it is possible to cover either the entire object or parts of an object which are bounded by the selection window. Depending on which coordinate points are then covered by the selection window, the parts of the object which correlate with these coordinate points are displayed in a separate list or in a separate window of the graphical user interface. Consequently, the user can specifically select certain parts of an object, that is, of the machine, in a purely visual manner without having to know the names of the individual information elements. Thus, for example, in a printing press, a printing cylinder can always be visually identified without difficulty, independently of the exact designation given to it by the individual manufacturer. The visual finding of the operating control elements and of the parts to be serviced considerably facilitates the learning process of a new machine, giving the user a considerable time advantage and thereby also saving him/her money.

In a first advantageous embodiment of the present invention, provision is made for the coordinate points to be points of a two-dimensional or three-dimensional coordinate system. A two-dimensional coordinate system presents itself if the information elements to be displayed are displayable in one plane. In this case, a two-dimensional coordinate system is sufficient, because here all information elements are located side-by-side on the graphical user interface. In the case of three-dimensional objects, such a printing press, a three-dimensional coordinate system offers the advantage that even parts that are located in different planes are easy to find. Therefore, using a three-dimensional coordinate system, any three-dimensional objects can be graphically displayed without difficulty, and all information elements contained therein can be spatially correlated, allowing the user to search in all three dimensions.

In the following embodiment of the present invention, provision is made for the selected information elements to be displayable on the display device in a structured order. Once the user has selected a certain set of information elements on the graphical user interface using the selection window, then these information elements are displayed on the graphical user interface in a list or another display format. In this context, it is advantageous if the selected information elements are displayed in a structured order, in particular, in alphabetical order from top to bottom or from left to right. In this manner, a possible further selection from the previous selection of information elements is facilitated as well.

Advantageously, provision is also made for the coordinate points to be points of a Cartesian coordinate system. The property of the Cartesian coordinate system that all space axes are perpendicular to each other allows easy and accurate correlation of the information elements in a three-dimensional object to be displayed. Here, there is in each case one coordinate axis for height, depth and width, respectively, the coordinates axes being perpendicular to each other. This form also allows the computer of the device according to the present invention to easily calculate the information elements selected by a selection window, eliminating the need to provide a complex program for controlling the device according to the present invention.

A particularly advantageous embodiment of the present invention is achieved in that the coordinate points are points of a three-dimensional Cartesian coordinate system, in that at least one second selection window is present, and that perpendicular support vectors of the planes defined by the first selection window and the second selection window are linearly independent. This embodiment is excellently suited for finding information elements in extended three-dimensional objects, such as a printing press, because here an additional second selection window is present which extends, for example, over the plane that corresponds to the top view of a printing press. Then, the other plane with the first selection window is in a side view, which allows information elements to be selected with their associated three-dimensional coordinate points in a Cartesian coordinate system in the side view relative to the width and height of a printing press using the first selection window, while the second window additionally allows selection of the depth of the machine in the top view. The selection of the first and second selection windows results in a three-dimensional intersection set of the two selection windows, which is then displayed to the user as the total selected subset of information items in a list or similar display format on the graphical user interface. To be able to make such a selection using two selection windows, it is, of course, important these selection windows are not linearly dependent on each other, that is, that they do not lie in the same plane or in parallel planes. In the case of a three-dimensional Cartesian coordinate system, it is therefore expedient for the planes defined by the selection windows to be perpendicular to each other.

In another advantageous embodiment of the present invention, it is proposed that a first information element contain further information elements whose coordinate points lie within the multidimensional extent of the first information element, and that a reference to the further information elements be present during the display of the first information element on the display device. When the user or operator has selected a subset of information elements using the at least one selection window, then the largest possible information elements that contain at least one coordinate point in the selected subset are displayed in a first step. That is, if the object is a printing press of which the user has selected a printing unit in the side view, then the information elements "printing cylinder", "dampening system", "inking system", and "cylinder washing system" are displayed in a first step. Of course, these subassemblies of a printing unit have further details, the details being displayed as references from the enumerated assemblies. That is, the information element "printing unit" includes all further information elements associated therewith, such as the inking system rollers, which hide behind the information element "inking unit" as individual details. The information element "inking unit" is expediently displayed as the head of a tree structure, which branches, from left to right, into the individual printing unit components, such as inking system rollers. This makes it easier for the user to find and select individual information elements, because he/she is initially provided with a display of a well-arranged and limited number of information elements of a superordinate term, but at the same time is informed that this information element contains further, more detailed information elements.

In a further embodiment of the present invention, provision is made for an information element to contain at least one reference to a drawing or a written name, or to an animation. In this manner, each individual information element can display additional information that goes beyond possible further, more detailed information elements. Thus, the aforementioned superordinate term "inking system", as an information element, can refer, for example, to a detailed drawing of an inking system of a printing press, the drawing being selectable, for example, by double-clicking on the term "inking system" on the graphical user interface. Then, the more detailed, further information elements of an inking system, such as the inking rollers, contain, for example, only the associated representation of an inking roller. However, it is also possible for the complete inking system to be displayed here as well, the selected inking roller being set off by color, for example, in red. In this manner, the user knows exactly the context in which the inking roller is located in the printing press. In the case of information elements having a more complex content, it is additionally possible to insert a reference to an animation, whereby, unlike in the case of a drawing, one does not get a static view of an information element, but, for example, a rotation of an information element, allowing the selected information element to be viewed from all sides. For example, if the term "inking system" is selected and double-clicked upon on the graphical user interface, then the inking system begins to rotate about itself in an animation, allowing the inking system to be viewed from all sides. In the field of maintenance, it is also useful if an information element to be serviced has added thereto a little film as a reference, in which maintenance is explained to the user in a detailed and comprehensible manner.

In another embodiment of the present invention, it is proposed that information elements be subdivided into at least two subsets, in particular, information types, that the information type be selectable on the graphical user interface, and that, upon selection of an information type, the matching subset of a selected information element be displayable. This embodiment offers the great advantage that the display of the information elements selected by the selection window or windows can be further narrowed down by an additional selection criterion, the information type. The information types are displayed on the graphical user interface as selectable function fields so that they can be selected by the user by clicking using an input device, such as a computer mouse or a track ball. If the object to be treated is a printing press, then, for example, the information type "maintenance" can be entered. By selecting the term "maintenance" it is ensured that, after selecting the information elements using the selection window or windows, only those information elements are displayed that actually need servicing. For example, if the user selects a printing unit, then not all information elements that are present in a printing unit are displayed, but, for example, only the bearings of the individual cylinders, because these are the only parts that need servicing. Further possible selection terms in connection with information types of a printing press are, for example, "operation", "electrical components", etc. It is also possible to proceed in such a way that, initially, an information element or a set of information elements is selected, followed by the selection of an information type so that the user can jump back and forth between the information types for selected information elements, for example, if he/she first wishes to retrieve technical data for an information element and thereafter wishes to obtain maintenance information as well.

Another embodiment of the present invention offers a similar advantage as the aforementioned embodiment in that at least one input field is provided on the graphical user interface of the display device, it being possible to enter arbitrary search terms in the at least one input field, and that a hit list containing the search terms found in the information elements or associated references to a drawing, a written name, a text, or to a graphic animation is displayable on the graphical user interface. While in the aforementioned embodiment of the present invention, individual information types are selectable on the graphical user interface via function fields that cannot be changed by the user, here, the user can freely choose to enter arbitrary terms in an alphanumeric manner in a text entry screen on the graphical user interface, and to search for them in the information materials underlying the device, as well as to display them on the graphical user interface. If here, the user selects, for example, a specific printing unit of a printing press using a selection window and enters the term "cylinder", then he/she gets a list including all cylinders that are present in the selected printing unit. This offers more freedom of selection than the predefined function fields containing the predefined information types. However, this embodiment is only useful if the device allows full-text searching of the references of the information elements for all data underlying the device.

The present invention is particularly suited to facilitate the operation and maintenance of complex machines as well as to identify spare parts, because here both individual parts of a machine and entire assemblies can be visually selected in a simple manner. For this reason, the device and the associated method are also particularly suited to facilitate the operation and maintenance of a paper-processing machine, in particular, of a printing press or folding machine.

In a further embodiment of the present invention, it is proposed that a specific variant of a machine or a specific device be selectable using a selection device or an input field on the graphical user interface and that only the information elements which are stored in the storage device and belong to the selected machine variant or the selected device can be displayed on the graphical user interface. If a user or operator has several machines, for example, several types of printing presses, then he/she can select the specific machine type on the user interface and is then provided with a display of only those information elements that are actually present in that machine type. In this context, the user can proceed in steps in that he/she first selects an entire machine series and then a specific model of this series. This can also be done by the printing press manufacturer in advance, which allows the manufacturer to create a device which is basically able to display all machine types made by the manufacturer, but which, depending on the configuration of the specific machine supplied, only allows selection and display of the information elements that are relevant to this machine variant, whereas the information elements that are not present remain invisible to the user.

BRIEF DESCRIPTION OF THE DRAWINGS

An exemplary embodiment of a device and method according to the present invention is illustrated and described in greater detail with reference to the following drawings, in which:

FIG. 1a shows a matrix of information types and information elements as a detail from FIG. 1c;

FIG. 3 depicts a further matrix of information elements and information types as well as a document which the information elements are taken from;

FIG. 5b is a front view of a control console according to FIG. 5a.

DETAILED DESCRIPTION

Figure 1B:
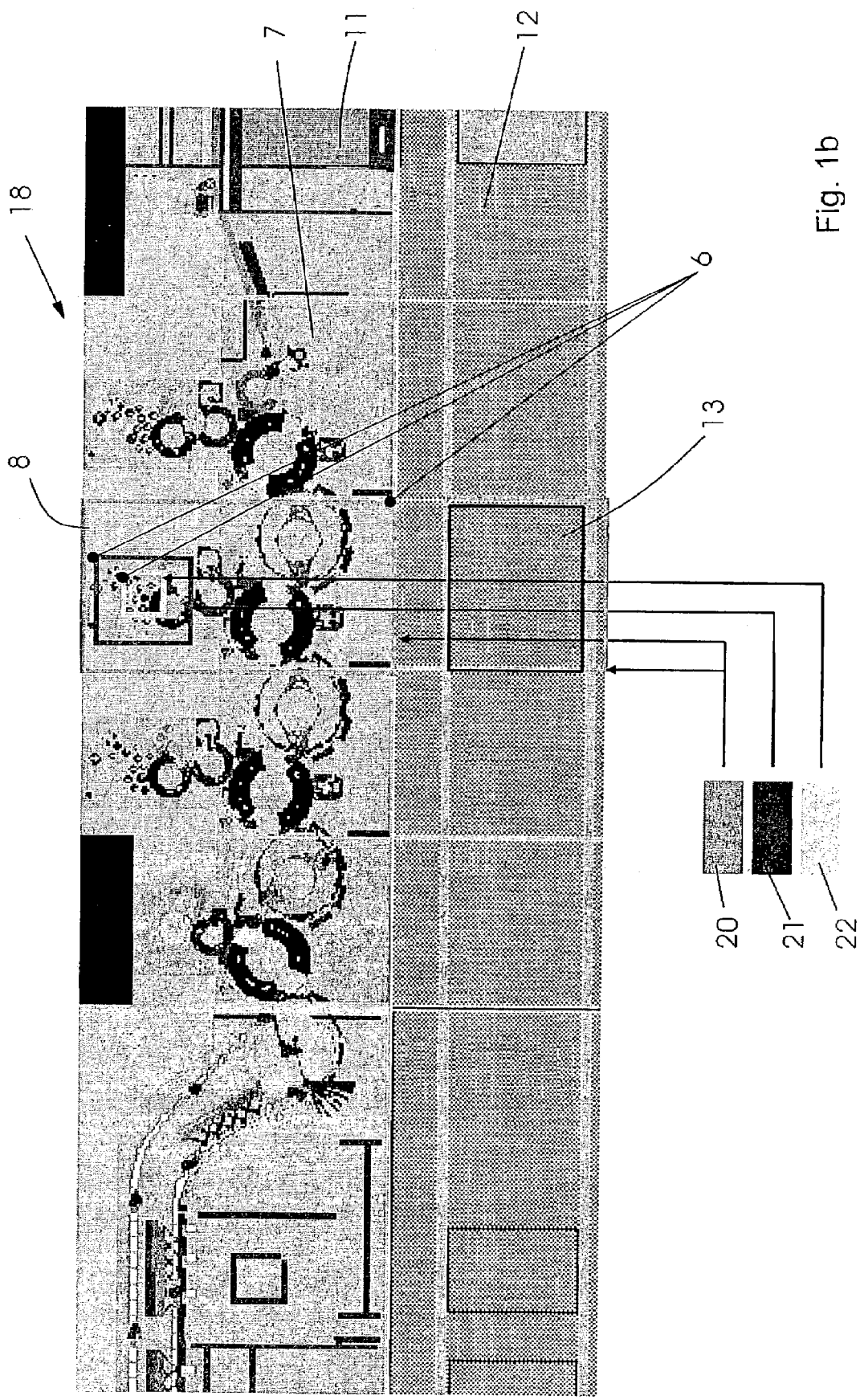
FIG. 1b shows a detail from a graphical user interface of a device according to the present invention as a further detail from FIG. 1c.
Figure 1C:
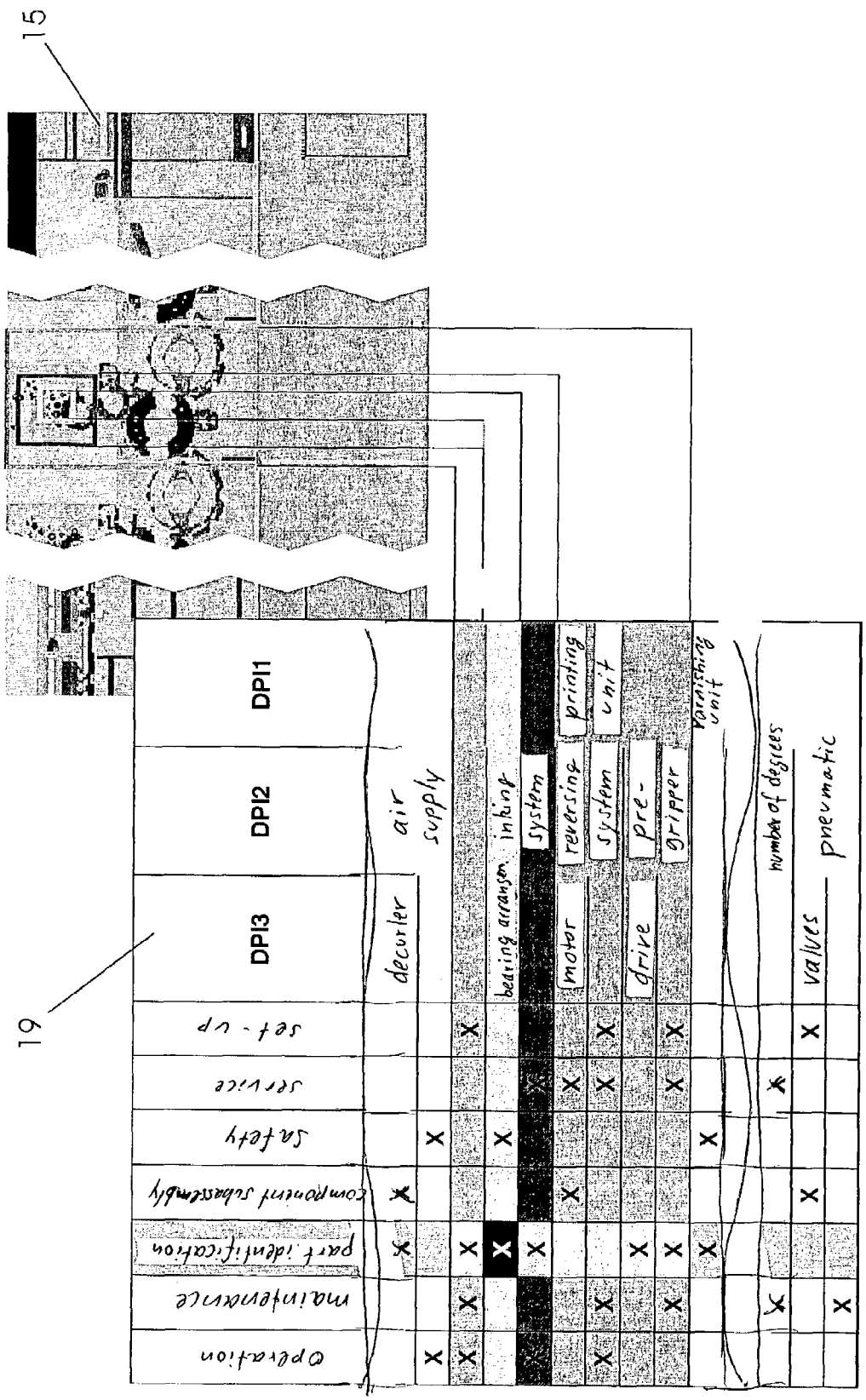
FIG. 1c shows, first of all, a section from a graphical user interface of a device according to the present invention at top right and, secondly, an overview of a matrix of information types and information elements on the left.

A device according to the present invention for a printing press 7 as an object 7 is described below as an exemplary embodiment. For improved clarity, FIG. 1c shows both a detail from a graphical user interface 18 of a device according to the present invention and a detail from a matrix-like table 19 of information types 2 and information elements 1 (FIG. 1a). Graphical user interface 18 is also shown in FIG. 1b in an enlarged view, while FIG. 1a is an enlarged view of matrix-like table 19. In FIGS. 1a, 1b, 1c, the visual connection between graphical user interface 18 and matrix-like table 19 is established via areas 20, 21, 22 marked in gray so that a selection procedure on graphical user interface 18 in conjunction with information elements 1 that are stored in a storage device is understandable. The storage device is conveniently the hard disk storage of a PC or laptop which, in addition to the hard disk storage, usually also have volatile memory (RAM), a main processor, and the usual computer interfaces. In this context, however, PC and laptop are mentioned only by way of example and can in future be replaced with more powerful small computers such as PDAs and similar devices having display devices and memory components.

In matrix-like table 19 in FIG. 1a, an information element 1 stored in the storage device is represented by an "X"; information elements 1 being displayed in rows and information types 2 in columns. In this context, information elements 1 are divided into three levels 24, which become more detailed from right to left; that is, on the right, there is, for example, the superordinate term "feeder", which is subdivided into the further information elements "drive" and "suction head"; the "suction head" featuring a "valve" as the smallest information element 1. The Xs in the matrix then show whether the particular information element 1 exists after selecting a specific information type 2. In FIG. 1a, the different levels are denoted by DPI1, DPI2 and DPI3, with DPI standing for "document related product index". Thus, this represents the different levels of a product, here of a printing press 7.

Here, by way of example, the information type "part identification" is selected as information type 2 in the column highlighted in gray; that is, all information elements 1 are displayed which refer to any parts or subassemblies of printing press 7 and which have been selected using graphical user interface 18. Now, different details of matrix-like table 19 in FIG. 1a can be selected using graphical user interface 18. For this purpose, the graphical user interface 18 in FIG. 1b has two rectangular selection windows 6, 13; first selection window 6 being movable across the entire side view of an object 7 to be displayed while second selection window 13 can be moved across the entire top view 12.

The selection windows 6 represented in different sizes show that selection window 6, just as selection window 13, is variable in size. Besides the rectangular shape of a selection window shown here, oval, rhombic, square, or other selection windows 6, 13 are conceivable as well. In this connection, the largest selection window 6 shown, which is highlighted in medium gray, includes the complete printing unit 8 of a printing press 7, whereas the smallest selection window 6, which is highlighted in light gray, selects only a small portion of a printing unit 8 of printing press 7. With the aid of linking areas 20, 21, 22, it can be seen how the selected sets of information elements 1 are carried out in matrix-like table 19 in FIG. 1a as a function of the size of selection windows 6 and 13. In this context, the largest selection window 6 corresponds to medium-gray area 20, whereby all information elements 1 of a printing unit 8 are selected in table 19. In this connection, medium-sized selection window 6 corresponds to dark-gray area 21, whereby the information elements 1 that belong to the inking system of printing unit 8 are selected. The smallest of selection windows 6 is associated with light-gray area 22, by which a bearing arrangement of an inking system in printing unit 8 of printing press 7 is selected. In this context, the part of information elements 1 selected by dark-gray area 21 and medium-gray area 20 is referred to as selected information elements 9, while at the same time an individual selected information element 10 represents the highest level of detail.

Since a printing unit 8 of a printing press 7 extends in three dimensions between the so-called gear side AS and the work side BS (See FIG. 4C), second selection window 13 allows a sharper selection of information elements 1 unless selection window 13 extends over the entire width of printing press 7 as viewed from above 12. In the exemplary embodiment according to FIGS. 1a, 1b, 1c, selection windows 6, 13 are coupled to each other in such a manner that they are always equal in width, but variable in height independently of each other. This is not mandatory, but useful, because it is always the intersection set of information elements 1 selected with the two selection windows 6, 13 that is selected from matrix-like table 19. If selection window 13 was located completely to the right or left of selection window 6, then automatically an empty intersection set would result, and no information elements 1 would be selected. However, this appears not to be useful. Therefore, independently of which selection window 6, 13 is changed in width, the respective other selection window 6, 13 is adapted accordingly. The adaptation of selection windows 6, 13 and the resulting selection of information elements 1 from matrix-like table 19 in the storage device are carried out using the mentioned PC or laptop and the arithmetic units contained therein. In addition, selection windows 6, 13 can also be equipped with a zoom function, which allows enlargement of individual details of printing press 7 or of machine 7 as a whole. Of course, such a zoom function can also be implemented separately of selection windows 6, 13, for example, by means of a separate magnifier function.

Figure 2A:
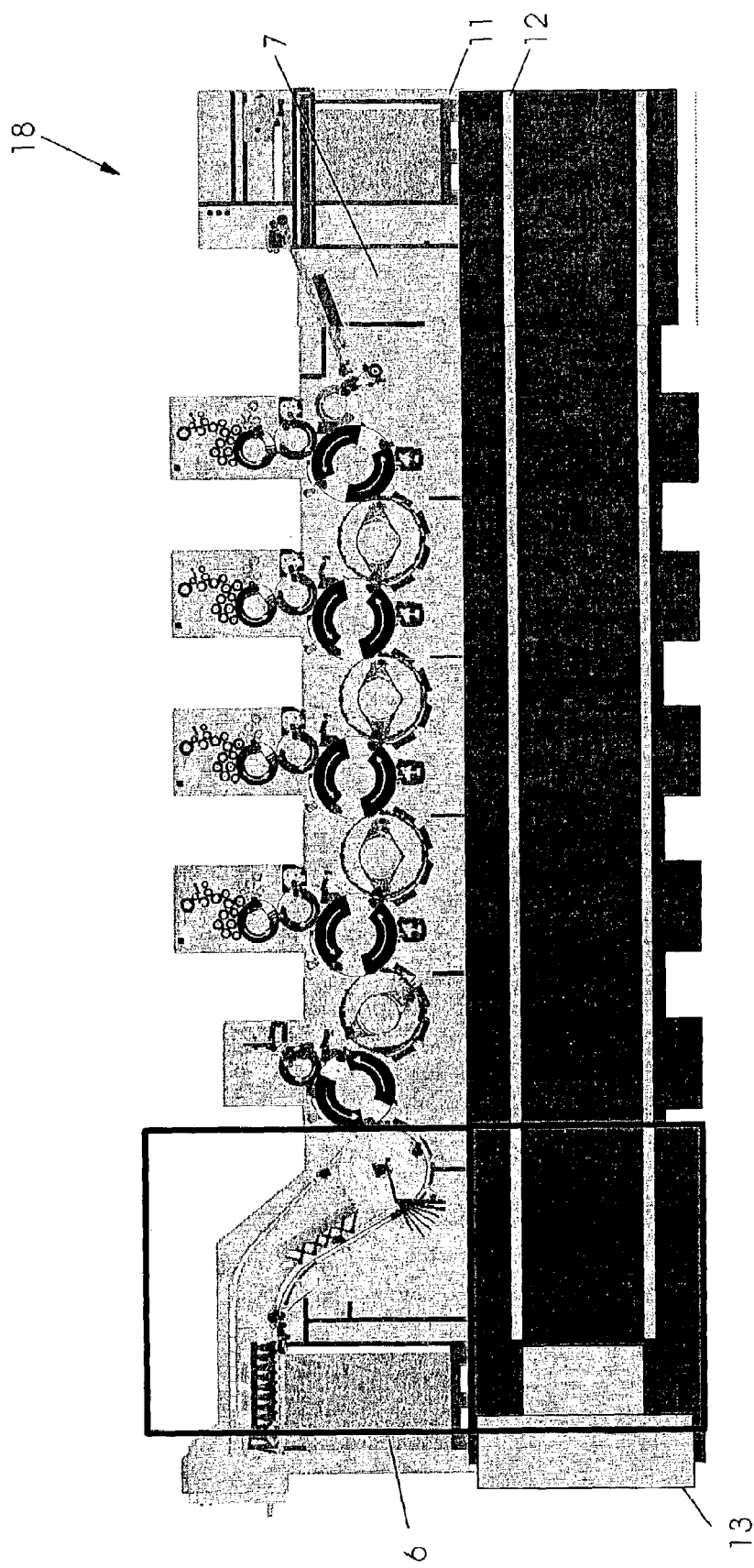
FIG. 2a is a view of a graphical user interface of a device according to the present invention after the selection has been made using selection windows.
Figure 2B:
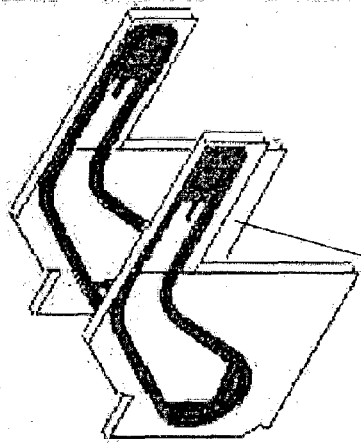
FIG. 2b shows a view of all information elements selected in FIG. 2a as well as a drawing of a selected information element.

FIG. 2a shows a graphical user interface 18 after a set of information elements 1 has been selected by selection windows 6, 13 from the side view 11 and the top view 12 of a printing press 7. In this context, the abbreviations AS and BS stand for the gear side and the work side of a printing press 7. The result of the selection of information elements 1 is shown in FIG. 2b. Here, the representation is done in a table 17. In this context, selected information elements 1 are hierarchically displayed from left to right and from top to bottom so that the largest selected information element 1, here the delivery device of a printing press 7, is arranged top left, and then further subcomponents of information elements 1 of the delivery are arranged in alphabetical order one below the other; these subcomponents, too, being nothing but information elements 1 and being capable of containing further information elements 1. In FIG. 2b, the subcomponent "sheet transport" of the delivery was selected by the user using a movable arrow so that the corresponding information element 1 "sheet transport" is displayed next to table 17. Here, this representation is in form of a drawing 15 showing a part of the delivery of a printing press 7; the subcomponent "sheet transport" selected by the user, including the associated information elements 1, being set off in dark gray in drawing 15. Moreover, the user has selected the information type 2 "operation" here in FIG. 2c using an input field 14 so that, as shown in FIG. 2d, all further information elements 1 are listed which have the information element "sheet transport" together with the information type 2 "operation". Here, these are the two information elements 1 "air adjustments on the delivery device" and "star wheel". In FIG. 2d, these are shown as detailed results of the selection procedure in region 16, which is highlighted in gray. This makes it possible to selectively find the set of solutions with little interactive effort.

Figure 2C:
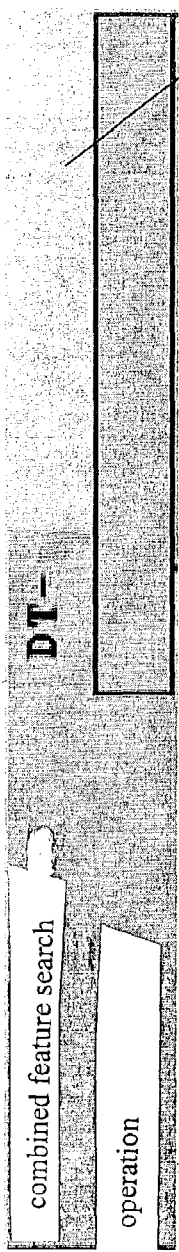
FIG. 2c shows a view of an input field for information types as well as a displayed search result.
Figure 2D:
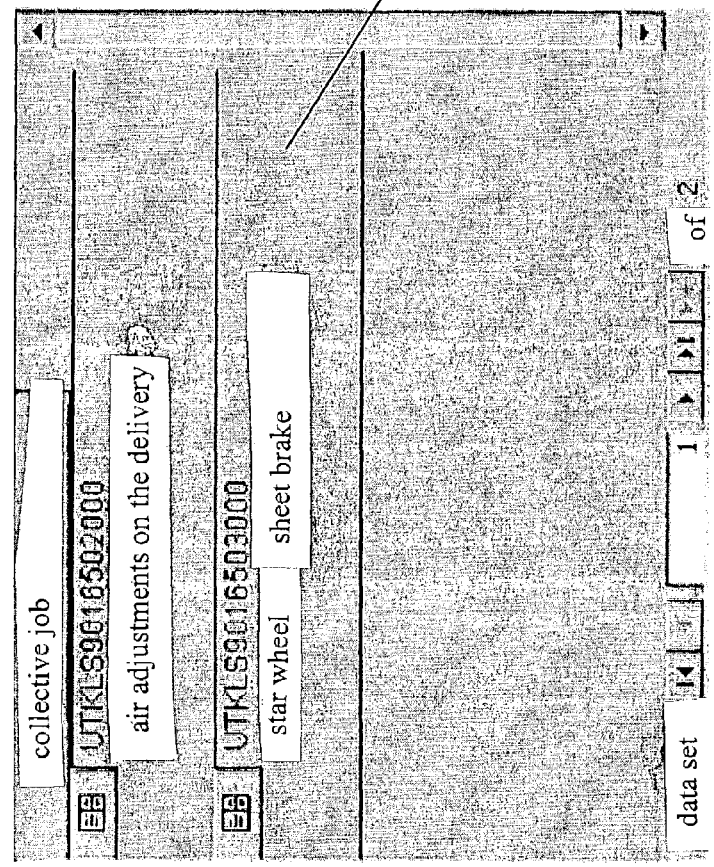
FIG. 2d shows the result of the information elements selected using the windows upon entry of an information type.

Thus, the selection procedure in FIGS. 2a, 2b, 2c is made up of the visual selection procedure using selection windows 6, 13 and a text selection on the basis of the information elements 1 which are selected using selection windows 6, 13 and shown in a table 17. This is a combined visual and textual search, which enables the operator and user to individually adapt his/her search operation to his/her level of knowledge of printing press 7. The lower the degree to which the user is acquainted with the terminology of printing press 7, the more he/she will orient himself/herself purely visually using selection windows 6, 13 and thereby narrow down the selection as precisely as possible, while an experienced user will select selection windows 6, 13 to be as large as possible and further orient himself/herself to the desired information elements 1 with the aid of the selected information elements 1 in table 17 in conjunction with input field 14. FIG. 2d shows the selected components for the information type 2 and information elements 1 selected using selection windows 6, 13.

Figure 3:
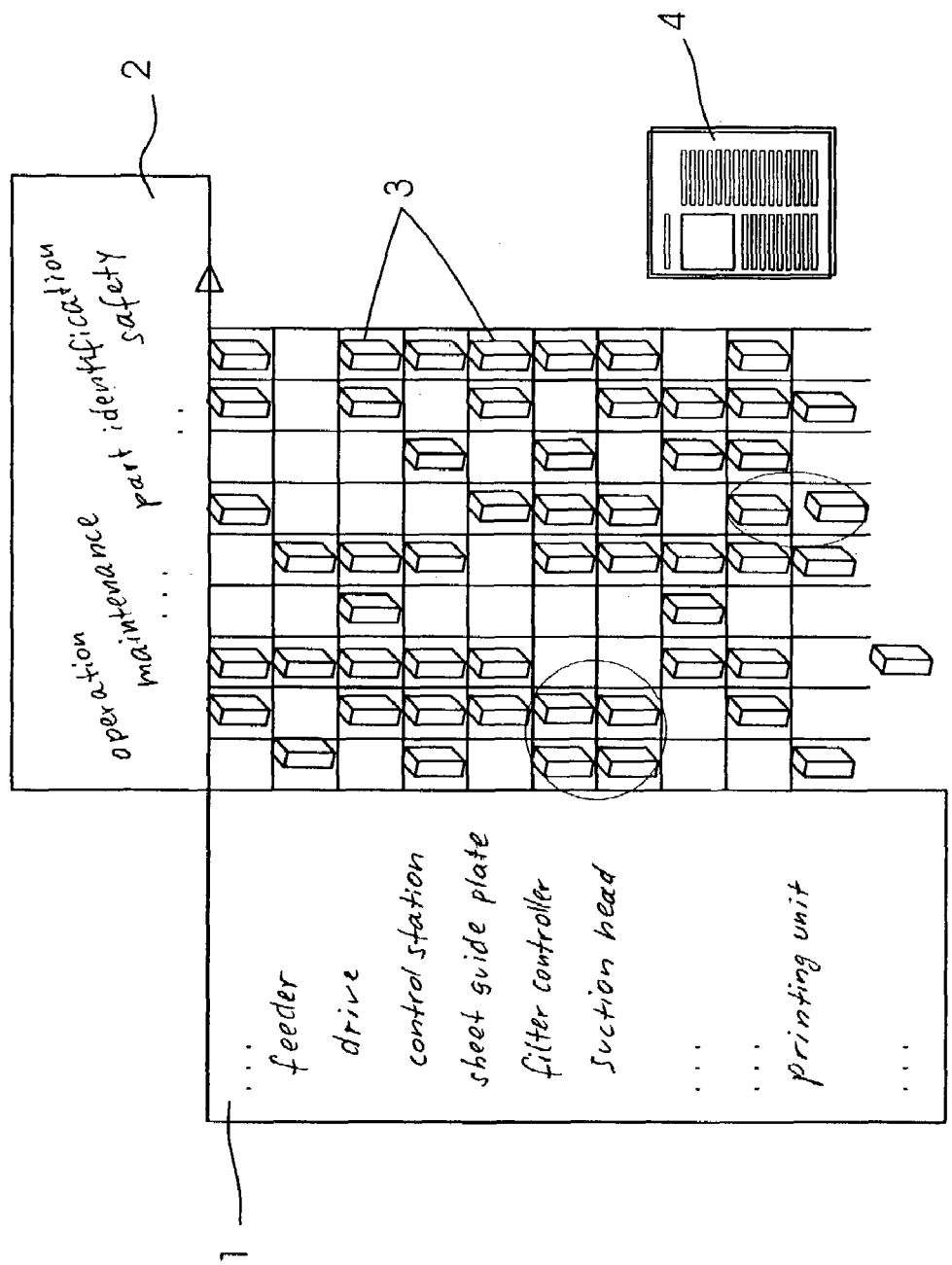

FIG. 3 illustrates how a conventional documentation element 4 of a printing press 7 becomes a device according to the present invention. Document 4 can be an operation manual made of paper, but it can also be an electronic document, such as a document in the known data format PDF. A technical writer searches this document 4 for all parts of a printing press 7 to be found therein, either manually or, in the case of electronic documents, in a computer-aided manner, after which the individual parts are associated, as so-called "smallest existing information units 3", with information elements 1 and information types 2 in a table. In this context, there are information elements 1 that are composed of a smallest information unit 3, but there are also information elements 1 which are composed of a plurality of smallest information units 3 and which, consequently, can, but do not have to contain further information elements 1 themselves at the same time.

Figure 4A:
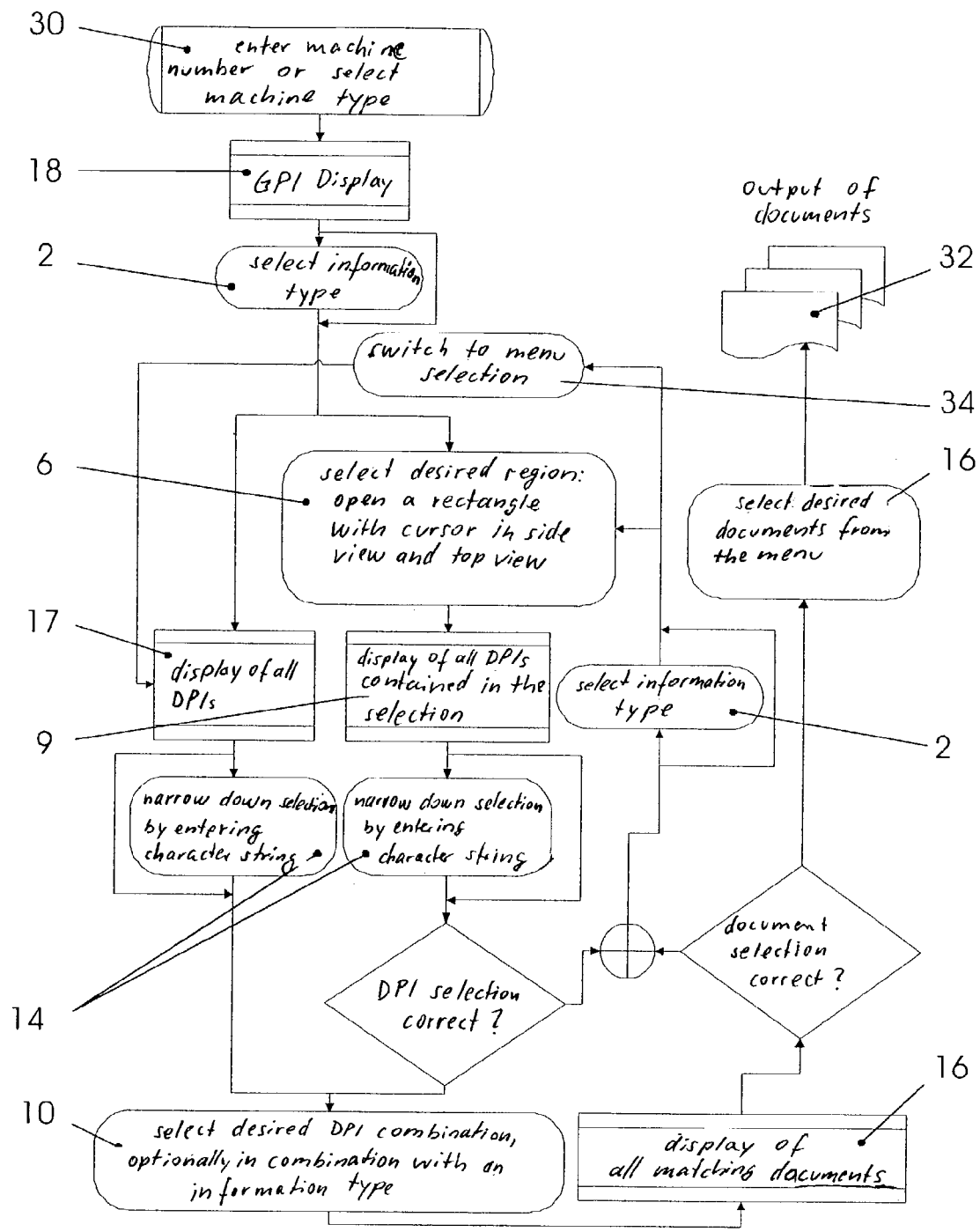
FIG. 4a is a flow chart of a method according to the present invention, featuring exemplary selection events.
Figure 4B:
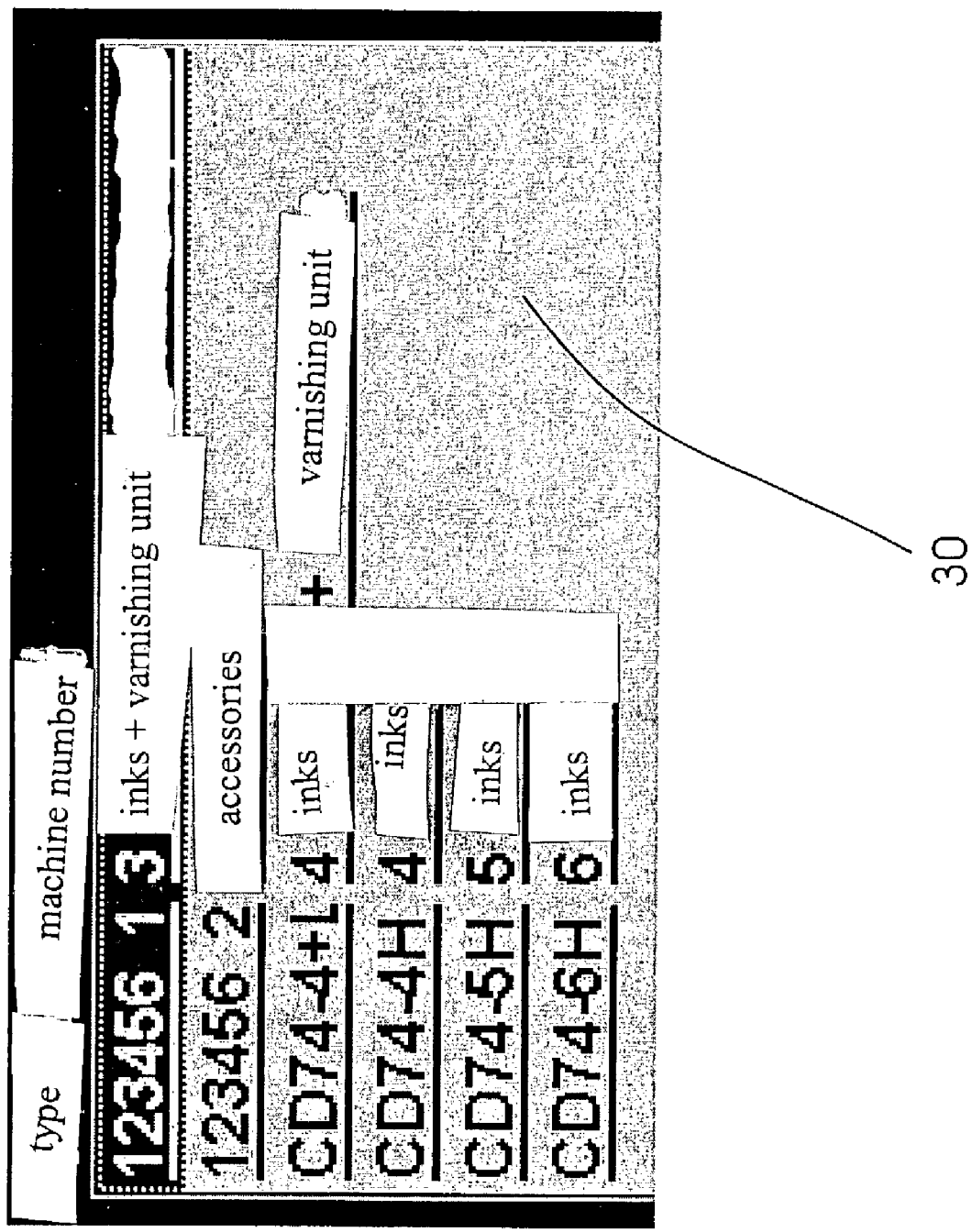
FIG. 4b depicts the selection event "machine type selection"
Figure 4C:
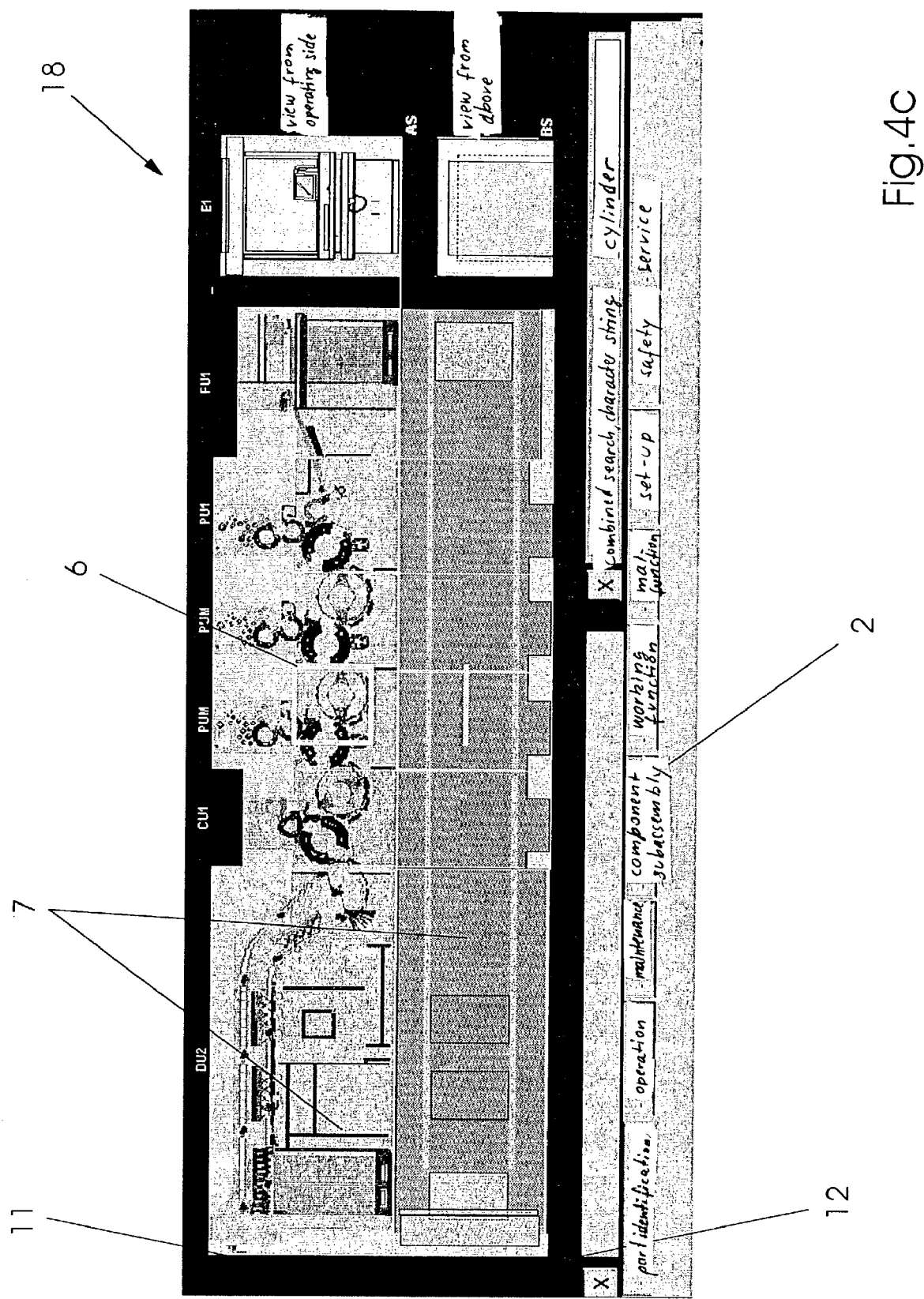
FIG. 4c shows the display of a selected machine type on the graphical user interface.
Figure 4D:
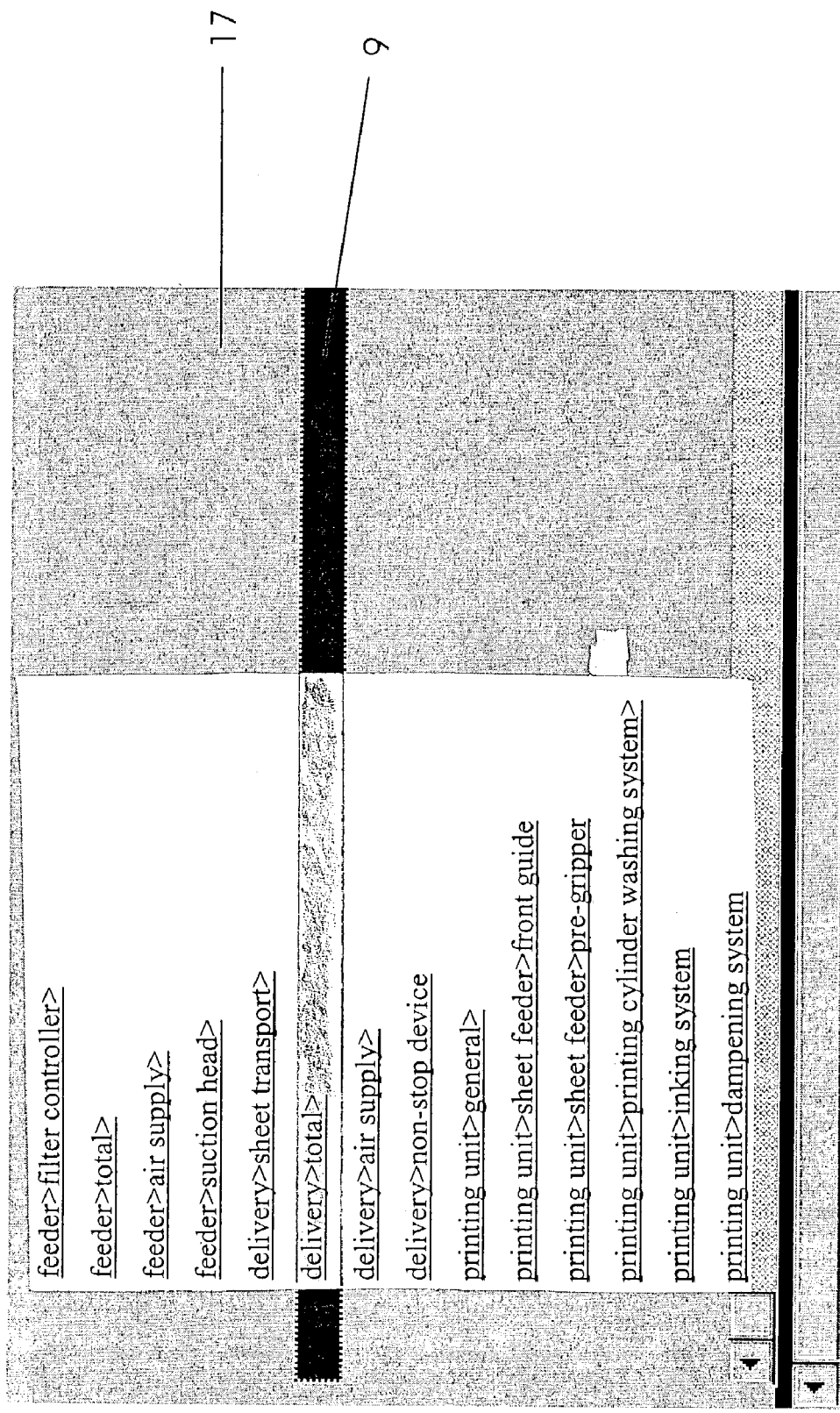
FIG. 4d shows the display of all information elements.
Figure 4E:
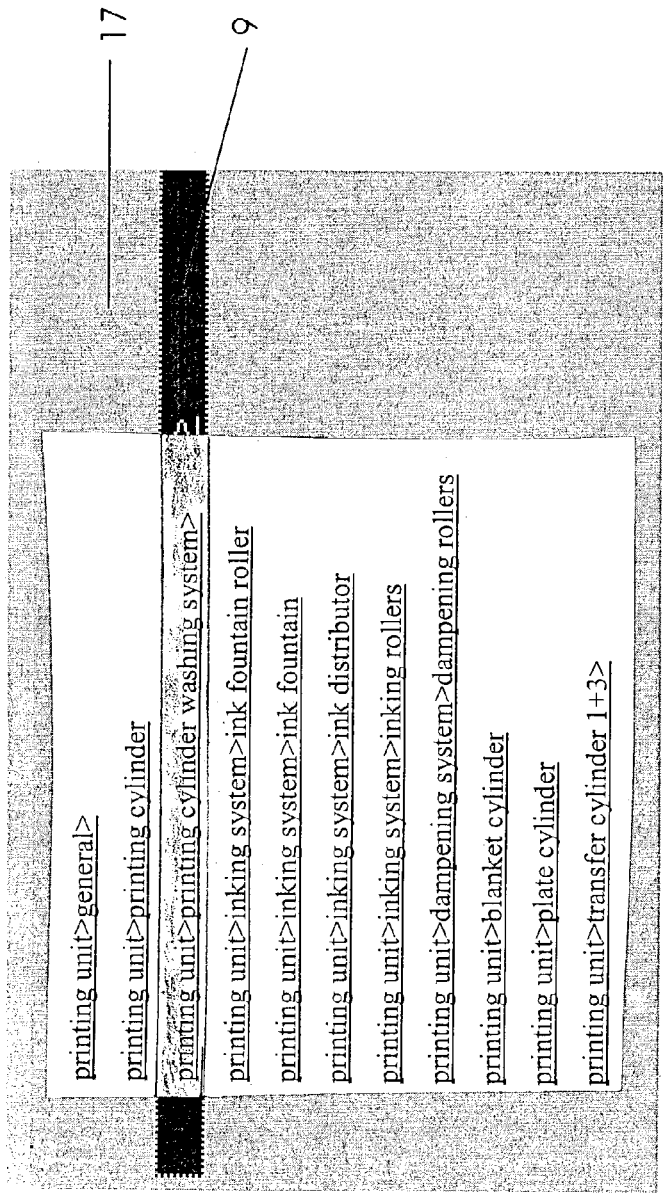
FIG. 4e shows the display of selected information elements.
Figure 4F:
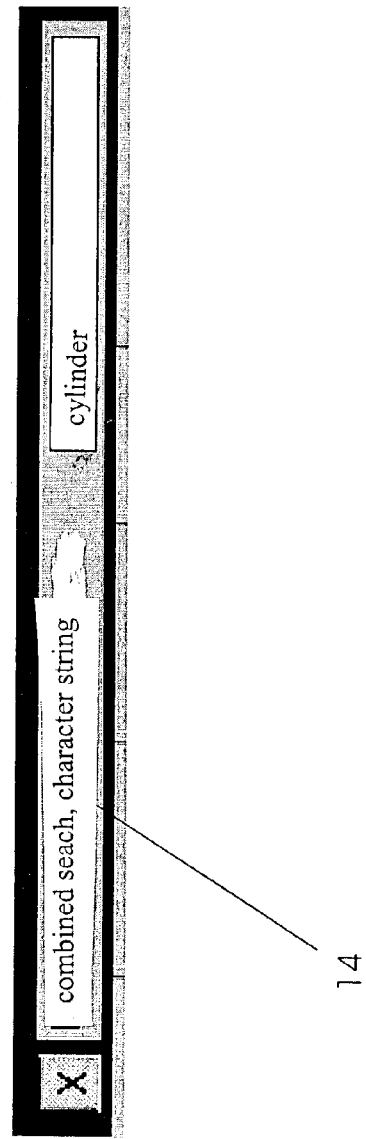
FIG. 4f depicts the input mask for character strings.
Figure 4G:
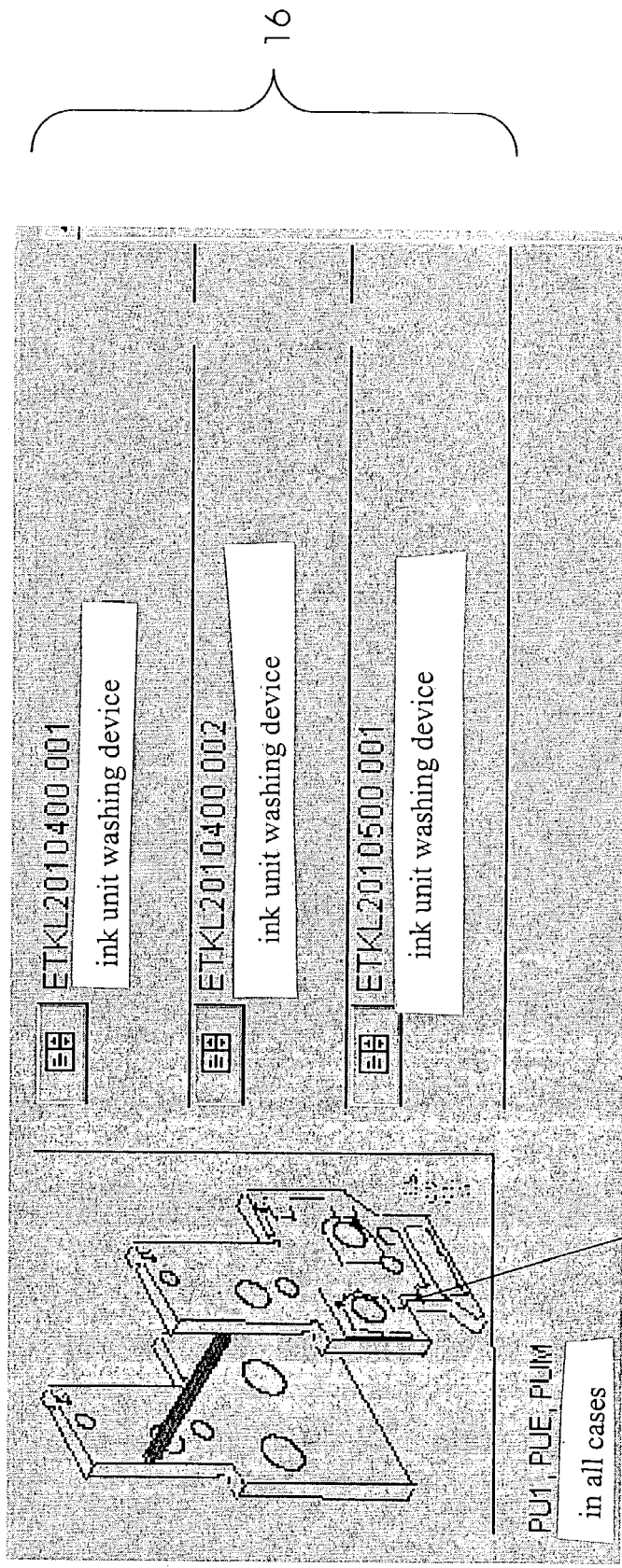
FIG. 4g shows the display of documents corresponding to a search result.
Figure 4H:
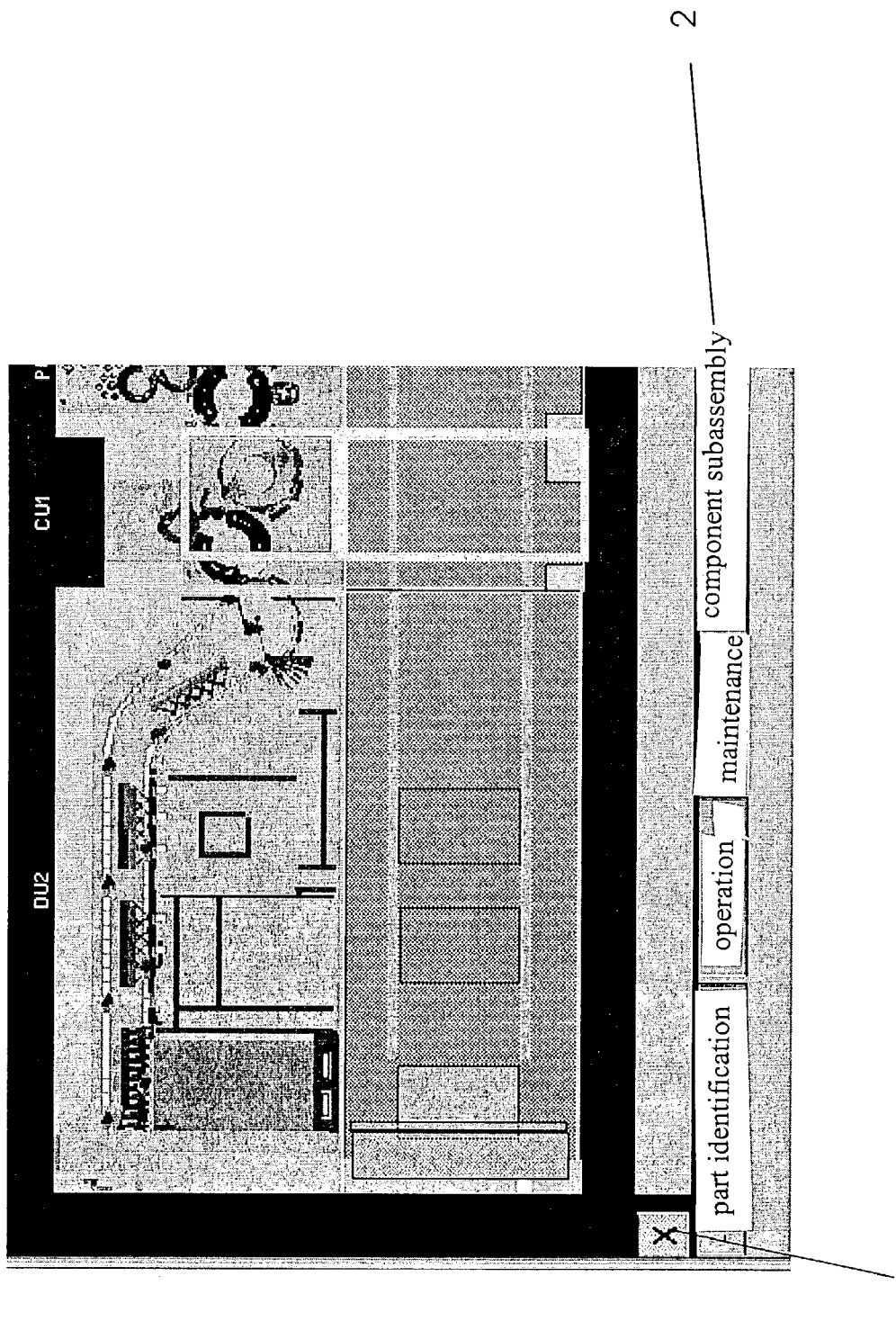
FIG. 4h depicts the switch bar for different information types.

The flow chart in FIG. 4a shows the sequence of selection procedures for finding information elements 1. The further FIGS. 4b through 4i show individual events from processes appearing in the flow chart in FIG. 4a. This is an embodiment of the present invention, which allows selection from several printing presses 7. Consequently, such an embodiment is not bound to a specific printing press and can therefore also be usefully implemented on a PC or laptop standing separate from a printing press. Therefore, in FIG. 4a, provision is made to enter a specific machine number or a specific machine type at the top, which are shown by way of example in box 30 in FIG. 4b. Upon selection of the machine, the respective machine 7 is graphically displayed according to FIG. 4c, the display including both a side view 11 and a top view 12. In this context, the graphical representation of printing press 7 in FIG. 4c is referred to as GPI, which means "graphical product index". Next, it is possible to select a so-called "information type" 2; that is, a selection is made as to whether information on the maintenance, operation, on the parts themselves, specific functions, fault indications, safety, service information, etc. is desired. However, this input can also be omitted, because it can still be made at a later time. After this selection has been made here using the selection fields, the desired region is visually selected on displayed printing press 7 using selection windows 6, 13, and the selected information elements are separately displayed by a display panel 17 from FIG. 4e. If no selection has been made using selection windows 6, 13, all information elements of printing press 7 are displayed in display panel 17 according to FIG. 4d. If information elements 1 selected using the selection windows still contain an excessive choice, it is possible to further narrow down information elements 1 by a text search in an input window 14, as shown in FIG. 4f. In this context, an arbitrary character string is entered in input window 14, the arbitrary character string then serving as a further selection criterion.

Figure 4I:
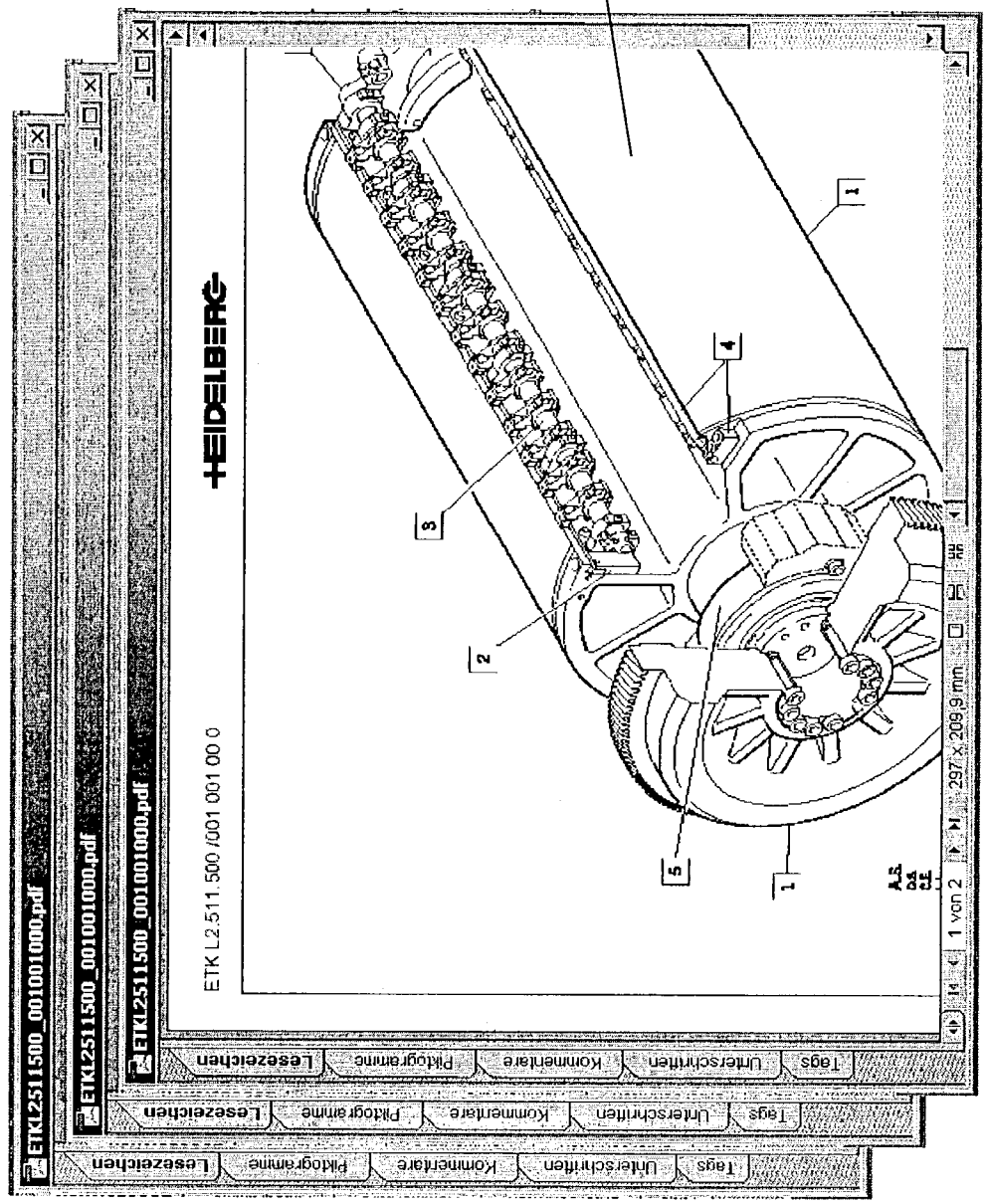
FIG. 4i represents the display of a document.

If the desired selection of information elements 1 is reached, then the relevant documents can be selected from table 17, for example, by clicking with the mouse, whereby the relevant information is then displayed, for example, by a drawing 32 according to FIG. 4i. In addition, it is now still possible to select an information type 2 in order to make the selection more precise. If the selected information element 1 relates, for example, to a certain part of a printing press 7, then it is also possible to switch back and forth between operation, part identification, maintenance, etc., according to FIG. 4h, after selection 34 has been made using information types 2, which are then called "customer information type" or CIT. Then, the corresponding documents are displayed on graphical user interface 18 in a further window 16 highlighted in gray, according to FIG. 4g. As described above, this window always contains also a drawing 15, in which selected information elements 9 are displayed such that they are set off by color.

Figure 5B:
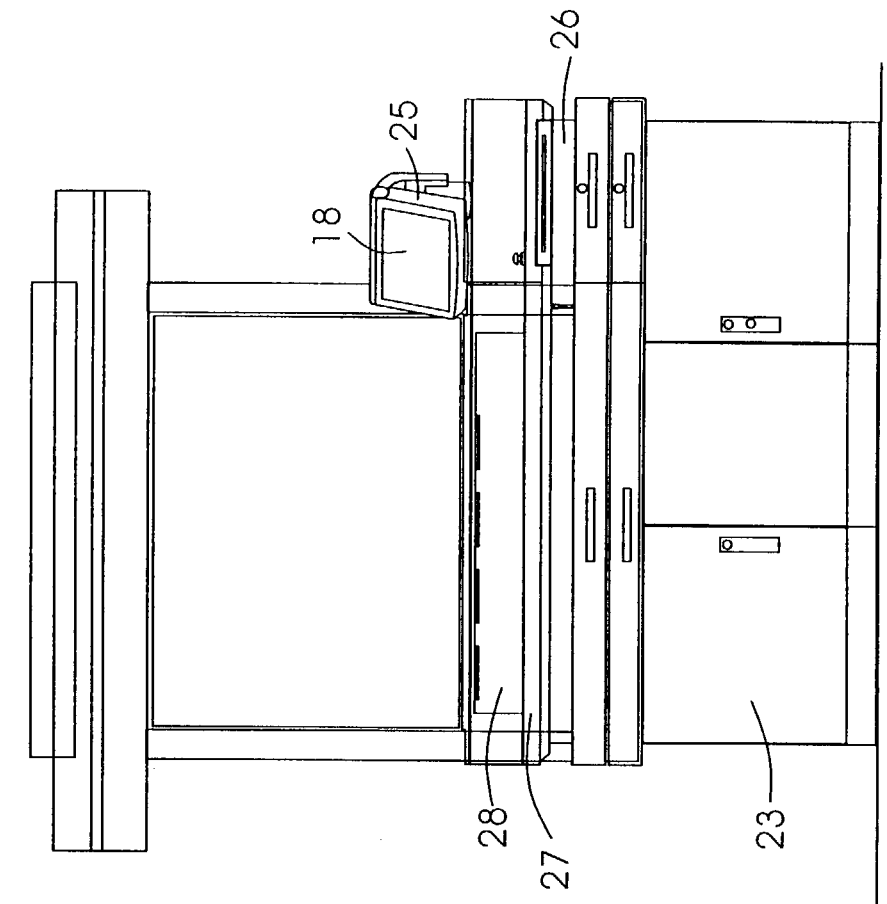
Figure 5A:
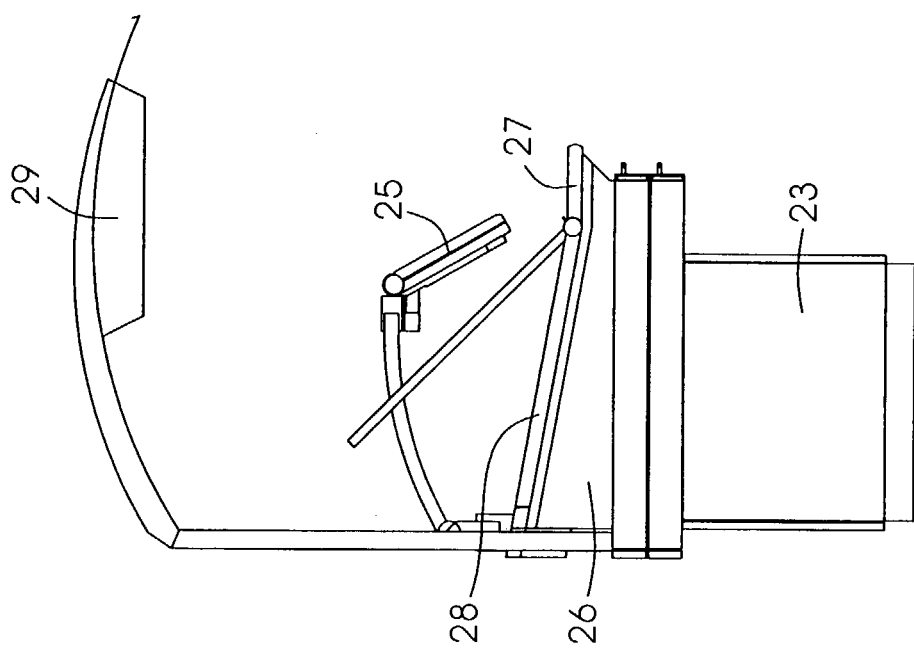
FIG. 5a is a side view of a control console of a printing press, the control console being equipped with the device according to the present invention.

FIGS. 5a and 5b show an inventive device for finding parts and for the simplifying of maintenance or operation of a printing press 7, the device being integrated into the control console of printing press 7. In this case, the device according to the present invention is installed in the control computer, an integrated PC 26, which, in the case of a printing press 7 of the type Speedmaster CD 74 from Heidelberger Druckmaschinen AG, is present anyway and which controls the graphical user interface called CP 2000 that is present in this printing press. The inventive device for finding information elements 1 can be easily integrated into this user interface CP 2000, since the appropriate hardware is present anyway in such a printing press 7. The printer, as the operator and user of machine 7, can then call up an additional graphical user interface 18 of the inventive device in a simple manner via the graphical user interface of the CP 2000 when he/she needs help in finding his/her way around machine 7. In this manner, the often complicated operation of a printing press 7 is greatly facilitated without the need for additional devices to be present or installed. In particular, this allows existing printing presses 7 to be easily equipped with the device according to the present invention, because it is only required to load software onto existing integrated PC 26.

In order to display graphical user interface 18, the control console of printing press 7 features a TFT LCD-based flat screen display 25, which corresponds to a computer monitor to the greatest possible extent. Moreover, the control console includes an ink-zone display 27, which allows adjustment of the ink zones of a print lying on a print support 28. For better illumination of the print, a lamp 29 is present above print support 28. Besides, a base cabinet 23 for accommodating additional devices is located in the lower half of the control console.

| List of Reference Numerals | |
|---|---|
| 1 | information element |
| 2 | information type |
| 3 | smallest information unit |
| 4 | document |
| 6 | selection window for the side view |
| 7 | printing press |
| 8 | printing unit of a printing press |
| 9 | selected information elements |
| 10 | a single selected information element |
| 11 | side view of a printing press |
| 12 | top view of a printing press |
| 13 | further selection window for the top view |
| 14 | input field for text entry or selection fields |
| 15 | drawing with highlighted information elements |
| 16 | subcomponent selection of a selected information element |
| 17 | table for displaying selected information elements |
| 18 | graphical user interface |
| 19 | matrix-like table |
| 20 | large selection window |
| 21 | medium-sized selection window |
| 22 | small selection window |
| 23 | base cabinet |
| 24 | selection levels |
| 25 | flat screen display |
| 26 | integrated PC |
| 27 | ink-zone display |
| 28 | print support |
| 29 | lighting |
| 30 | display for machines types |
| 32 | display of a drawing associated with an information element |
| 34 | completed selection |
| AS | gear side of a printing press |
| BS | work side of a printing press |

What is claimed is:

1. A device for finding information elements in one or more objects, the information elements being storable in a storage device, the objects being displayable on a display device via a graphical user interface, the information elements being parts or assemblies of at least one machine or at least one device and the objects being a machine or device, comprising:

a display device having a graphical user interface for graphically displaying an object, the information elements being arranged in a coordinate system of the graphically displayed object so that each information element has associated therewith at least one coordinate point in the graphically displayed object;

the graphical user interface including, for finding the desired information element, at least one selection window variable in size or shape allowing selection of an arbitrarily-sized subset of coordinate points and associated information elements of the object so as to define selected information elements by dragging the selection window across the object displayed in the graphical user interface; and the selected information elements being displayable on the graphical user interface of the display device;

wherein the coordinate points are points of a three-dimensional Cartesian coordinate system; the graphical user interface including at least one second selection window, perpendicular support vectors of planes defined by the first selection window and the second selection window being linearly independent.

2. The device as recited in claim 1 wherein the selected information elements are displayable on the graphical user interface of the display device in a structured order.

3. The device as recited in claim 1 wherein three-dimensional subsets of coordinate points and associated information elements are selectable in the graphically displayable object using the selection window and the second selection window.

4. The device as recited in claim 1 wherein a first information element of the information elements contains further information elements whose coordinate points lie within a multidimensional extent of the first information element; and a reference to the further information elements is present during the display of the first information element on the graphical user interface of the display device.

5. The device as recited in claim 1 wherein one of the information elements contains at least one reference to a drawing, a written name, a text, or to a graphic animation.

6. The device as recited in claim 1 wherein the information elements are subdivided into at least two information types, the information type being selectable on the graphical user interface; and upon selection of a selected information type, a matching subset of a selected information element is displayable.

7. The device as recited in claim 1 wherein a specific machine or a specific device is selectable using a selection device or an input field on the graphical user interface; and only the information elements stored in the storage device and belonging to the selected machine or the selected device can be displayed and selected on the graphical user interface.

8. The device as recited in claim 1 wherein the machine is a paper-processing machine.

9. The device as recited in claim 8 wherein the machine is a printing press or a folder.

10. A device for finding information elements in one or more objects, the information elements being storable in a storage device, the objects being displayable on a display device via a graphical user interface, the information elements being parts or assemblies of at least one machine or at least one device and the objects being a machine or device, comprising:

a display device having a graphical user interface for graphically displaying an object, the information elements being arranged in a coordinate system of the graphically displayed object so that each information element has associated therewith at least one coordinate point in the graphically displayed object;

the graphical user interface including, for finding the desired information element, at least one selection window variable in size or shape allowing selection of an arbitrarily-sized subset of coordinate points and associated information elements of the object so as to define selected information elements by dragging the selection window across the object displayed in the graphical user interface;

the selected information elements being displayable on the graphical user interface of the display device;

wherein at least one input field is provided on the graphical user interface of the display device for entering arbitrary search terms; and a hit list containing the search terms found in the information elements or associated references to a drawing, a written name, a text, or to a graphic animation is displayable on the graphical user interface; and a comparator device to calculate an intersection set of the hit list with the information elements selected using at least one selection window; and the information elements present in the intersection set being displayable on the graphical user interface.

11. A method for finding information elements in one or more objects, the information elements being stored in a storage device, the objects being displayed on a display device via a graphical user interface, the information elements being parts or assemblies of at least one machine or at least one device and the objects being a machine or device, comprising the steps of:

arranging the information elements in a coordinate system of a graphically displayed object so that each information element has associated therewith at least one coordinate point in the graphically displayed object;

in order to find a desired information element using the graphical user interface, using at least one first selection window and at least one second selection window variable in size or shape to select an arbitrarily-sized subset of coordinate points and associated information elements of the object by dragging the at least one first selection window and the at least one second selection window across the object displayed in the graphical user interface; and displaying the selected information elements on the graphical user interface of the display device;

wherein the coordinate points are points of a three-dimensional Cartesian coordinate system; perpendicular support vectors of planes defined by the first selection window and the second selection window being linearly independent.

12. The method as recited in claim 11 wherein the selected information elements are displayed on the graphical user interface of the display device in a structured order.

13. The method as recited in claim 11 wherein the information elements are subdivided into at least two information types, the information type being selected on the graphical user interface; and upon selection of one of the information types, a matching subset of a selected information element being displayed in the graphical user interface of the display device.

14. The method as recited in 11 wherein the information elements are parts or assemblies of at least one machine or at least one device; a specific machine or a specific device is selected using a selection device or an input field on the graphical user interface; and only the information elements stored in the storage device and belonging to the selected machine or the selected device can be displayed and selected on the graphical user interface.

15. A method for finding information elements in one or more objects, the information elements being stored in a storage device, the objects being displayed on a display device via a graphical user interface, the information elements being parts or assemblies of at least one machine or at least one device and the objects being a machine or device, comprising the steps of:

arranging the information elements in a coordinate system of a graphically displayed object so that each information element has associated therewith at least one coordinate point in the graphically displayed object;

in order to find a desired information element using the graphical user interface, using at least one selection window variable in size or shape to select an arbitrarily-sized subset of coordinate points and associated information elements of the object by dragging the selection window across the object displayed in the graphical user interface; and displaying the selected information elements on the graphical user interface of the display device;

wherein arbitrary search terms are entered in at least one input field on the graphical user interface; and a hit list containing the search terms found in the information elements or associated references to a drawing, a written name, a text, or to a graphic animation is displayed on the graphical user interface;

wherein an intersection set of the hit list with the information elements selected using at least one selection window is calculated by a comparator device; and the information elements present in the intersection set are displayed on the graphical user interface.

* * * * *